(12) United States Patent
Duleba (10) Patent No.: US 9,791,280 B2
(45) Date of Patent: Oct. 17, 2017

(54) DETERMINING A ROUTE

(71) Applicant: Google Inc., Mountain View, CA (US)

(72) Inventor: Krzysztof Duleba, Pfaffikon SZ (CH)

(73) Assignee: Google Inc., Mountain View, CA (US)

( * ) Notice: Subject to any disclaimer, the term of this patent is extended or adjusted under 35 U.S.C. 154(b) by 109 days.

(21) Appl. No.: 13/723,478

(22) Filed: Dec. 21, 2012

(65) Prior Publication Data

US 2015/0168147 A1   Jun. 18, 2015

(51) Int. Cl.
*G01C 21/20* (2006.01)
*G01C 21/34* (2006.01)

(52) U.S. Cl.
CPC ......... *G01C 21/20* (2013.01); *G01C 21/3484* (2013.01); *G01C 21/3492* (2013.01)

(58) Field of Classification Search
CPC ............ G01C 21/3484; G01C 21/3461; G01C 21/3423; G01C 21/3641; G01C 21/34
USPC .......................................................... 701/533
See application file for complete search history.

(56) References Cited

U.S. PATENT DOCUMENTS

| | | | | |
|---|---|---|---|---|
| 6,014,607 | A * | 1/2000 | Yagyu et al. | 701/533 |
| 2007/0073480 | A1* | 3/2007 | Singh | 701/211 |
| 2009/0157292 | A1* | 6/2009 | Currie | G01C 21/34 |
| | | | | 701/532 |
| 2009/0182498 | A1* | 7/2009 | Seymour | G01C 21/20 |
| | | | | 701/533 |
| 2011/0301832 | A1* | 12/2011 | Zheng | G01C 21/3667 |
| | | | | 701/425 |

* cited by examiner

*Primary Examiner* — Jerrah Edwards
*Assistant Examiner* — Kelly D Williams
(74) *Attorney, Agent, or Firm* — Dority & Manning, P.A.

(57) ABSTRACT

A method, system and apparatus for determining a route between start and finish locations by searching journey tracks shared by users and using tracks identified in the search to determine the route between the start and finish locations.

19 Claims, 7 Drawing Sheets

DETERMINING A ROUTE

FIELD

The invention relates to determining a route between two geographical locations.

BACKGROUND

Determination of a route between two geographical locations is usually carried out by identifying suitable roads and/or trails marked on a map between the locations.

SUMMARY

Embodiments of the invention described herein determine a route between two geographical locations using previously followed routes which have been shared by users.

In embodiments, a computer implemented method of determining a route comprises searching journey tracks shared by users to identify at least one journey track which is located within a predetermined area of a defined route start location; searching journey tracks shared by users to identify at least one journey track which is located within a predetermined area of a defined route finish location; using at least one of the identified journey tracks to determine a route between the defined start and finish locations.

In embodiments, a computer implemented method of determining a route comprises identifying at least one shared GPS track which passes through a geographical area specified in a route request; and determining a route between two geographical locations which includes at least a part of the at least one identified GPS track.

In embodiments, a route provider apparatus for determining a route comprises at least one computer processor and at least one computer-readable memory storing instructions which when executed by the at least one processor cause the at least one processor to: search journey tracks shared by users to identify at least one journey track which is located within a predetermined area of a defined route start location; search journey tracks shared by users to identify at least one journey track which is located within a predetermined area of a defined route finish location; and use at least one of the identified journey tracks to determine a route between the defined start and finish locations.

In embodiments, a route provider apparatus for determining a route comprises at least one computer processor and at least one computer-readable memory storing instructions which when executed by the at least one processor cause the at least one processor to: identify at least one shared GPS track which passes through a geographical area specified in a route request and determine a route between two geographical locations which includes at least a part of the at least one identified GPS track.

In embodiments, a system for requesting and determining a route for providing to a user comprises a route requester comprising at least one computer processor and at least one computer-readable memory storing instructions which when executed by the at least one processor cause the at least one processor to generate a route request in response to a user input; and a route provider comprising at least one processor and at least one memory storing instructions which when executed by the at least one processor cause the at least one processor to respond to the route request by identifying a route start location and a route finish location from the route request and to search journey tracks shared by users to identify tracks which form at least part of a route between the start and finish locations.

In embodiments, a system for requesting and determining a route for providing to a user comprises at least one computer processor and at least one computer-readable memory storing instructions which when executed by the at least one processor cause the at least one processor to generate a route request in response to a user input, respond to the route request by identifying a route start location and a route finish location from the route request and search journey tracks shared by users to identify tracks which form at least part of a route between the start and finish locations.

In embodiments, a system for determining a route for providing to a user comprises at least one computer processor and at least one computer-readable memory storing instructions which when executed by the at least one processor cause the at least one processor to identify at least one shared GPS track which passes through a geographical area specified in a route request and determine a route between two geographical locations which includes at least a part of the at least one identified GPS track.

In embodiments, a system for determining a route for providing to a user comprises at least one computer processor and at least one computer-readable memory storing instructions which when executed by the at least one processor cause the at least one processor to search journey tracks shared by users to identify at least one journey track which is located within a predetermined area of a defined route start location; search journey tracks shared by users to identify at least one journey track which is located within a predetermined area of a defined route finish location; and use at least one of the identified journey tracks to determine a route between the defined start and finish locations.

In embodiments, a computer-readable storage medium is encoded with computer-readable instructions which when executed by one or more computer processors cause the one or more processors to identify at least one shared GPS track which passes through a geographical area specified in a route request and determine a route between two geographical locations which includes at least a part of the at least one identified GPS track.

In embodiments, a computer-readable storage medium is encoded with computer-readable instructions which when executed by one or more computer processors cause the one or more processors to generate a route request in response to a user input, respond to the route request by identifying a route start location and a route finish location from the route request and search journey tracks shared by users to identify tracks which form at least part of a route between the start and finish locations.

In embodiments, a computer-readable storage medium is encoded with computer-readable instructions which when executed by one or more computer processors cause the one or more processors to search journey tracks shared by users to identify at least one journey track which is located within a predetermined area of a defined route start location, search journey tracks shared by users to identify at least one journey track which is located within a predetermined area of a defined route finish location and use at least one of the identified journey tracks to determine a route between the defined start and finish locations.

BRIEF DESCRIPTION OF THE FIGURES

In order that the invention may be more fully understood, and for the purposes of example only, embodiments of the invention are described below with reference to the accompanying figures in which.

DETAILED DESCRIPTION

Users who wish to travel through a geographical area with which they are not familiar are often constrained by the road and path network known to them. For example, a user wishing to travel between two geographical locations would normally consult a map to identify roads, paths or trails marked on the map along which the user could safely travel in order to arrive at their chosen destination. Many users are unlikely to have the confidence to leave the marked path network, especially if they are in a geographical area with which they are unfamiliar.

Furthermore, if there are no suitable roads or paths marked on the map, a user is unable to travel between the two locations without leaving the marked path network and attempting to find their own route. Such actions may be dangerous for the user, especially if they are not equipped with a highly detailed map of the terrain or are inexperienced at travelling off marked routes.

System Architecture

Figure 1:
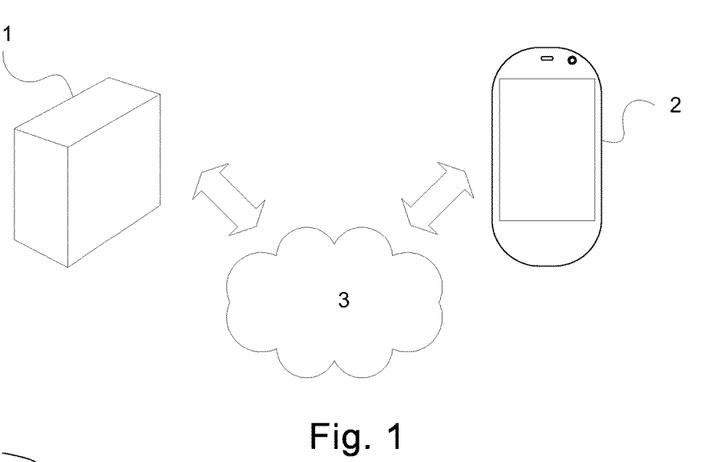
FIG. 1 is a schematic illustration of a system for requesting a route and providing the route to a user, comprising a route provider and a route requester.

FIG. 1 illustrates a system for requesting and providing a route between two geographical locations. The system comprises a route provider 1 and a route requester 2 which are communicatively coupled together so that they can send and receive data to and from each other. Any type of suitable communication coupling 3 can be used, as discussed further below.

The route provider 1 may comprise an electronic apparatus which is configured to receive a request for a route and, in response, to provide the route. For example, the route provider 1 may be configured to respond to a route request which specifies a start location and a finish location by determining a suitable route between the locations and causing the route to be provided to a user.

Figure 2:
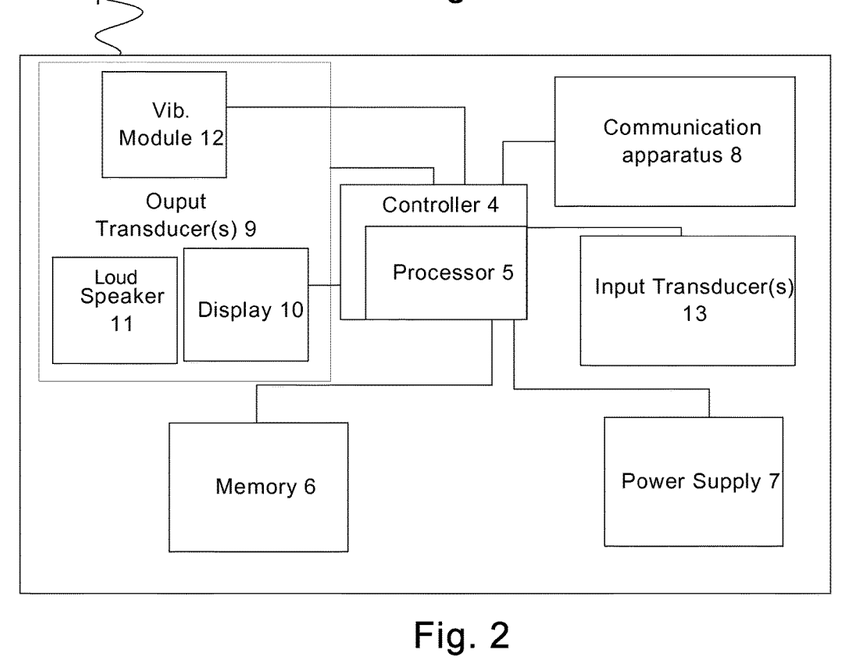
FIG. 2 is a schematic illustration of an electronic apparatus of a route provider.

As shown in FIG. 2, the route provider apparatus comprises one or more controllers 4, each of which includes a processor 5 or a plurality of processors 5, which are configured to operate under the control of computer readable code to determine the route. The computer readable code may be stored in one or more memory mediums 6, such as ROM or RAM, of the route provider 1, along with route data from which the route provider 1 is configured to determine the route. This is described in more detail below. Alternatively, the code may be stored in a separate electronic apparatus with which the route provider 1 is communicatively coupled during operation. A power supply 7 is configured to supply power to components of the route provider 1. For example, the power supply 7 may be configured to couple to a mains power supply so as to supply mains power to the apparatus components. Additionally or alternatively, the power supply 7 may comprise a re-chargeable energy source 7, such as a battery or fuel cell, which can be coupled to a mains power supply for re-charging.

The route provider 1 also comprises a communication apparatus 8 for receiving and sending data over the communication coupling 3. The communication apparatus 8 comprises an electronic signal input and output, such as one or more suitable ports and/or antennas, and transceiver circuitry for sending and receiving the data. This data may comprise the route requests and determined routes referred to above. The communication apparatus 8 may also comprise a position-locating module which is configured to determine the geographical location of the route provider 1. An example of such a module is a GPS module which is configured to determine its location using the Global Positioning System.

The route provider 1 may comprise one or more output transducers 9 through which the determined route can be provided to a user. For example, the output transducers 9 may comprise visual output transducers, such as a display panel 10, and non-visual output transducers, such as a loudspeaker 11 and a vibration module 12. The output transducers 9 are configured to provide feedback to a user. In particular, the output transducers 9 may be controlled by the controller(s) 4 to provide route information. An example is to display a route or route instructions in the display panel 10, or to provide the route or route instructions in audible form such as by outputting spoken instructions from the loudspeaker 11.

The route provider 1 may also comprise one or more input transducers 13, through which a user can input instructions to the route provider 1 to control the manner in which it determines or provides the route. Such input transducers 13 may, for example, comprise user controls on a body of the provider 1 or a touch sensitive transducer overlaid on or integrated into the display panel 10 to form a touch-sensitive display 10 which is responsive to tactile inputs from the user. The input transducers 13 generate and supply signals to the controller(s) 4 in response to detecting user inputs, thereby allowing a user to input commands to control the route provider 1.

Figure 3:
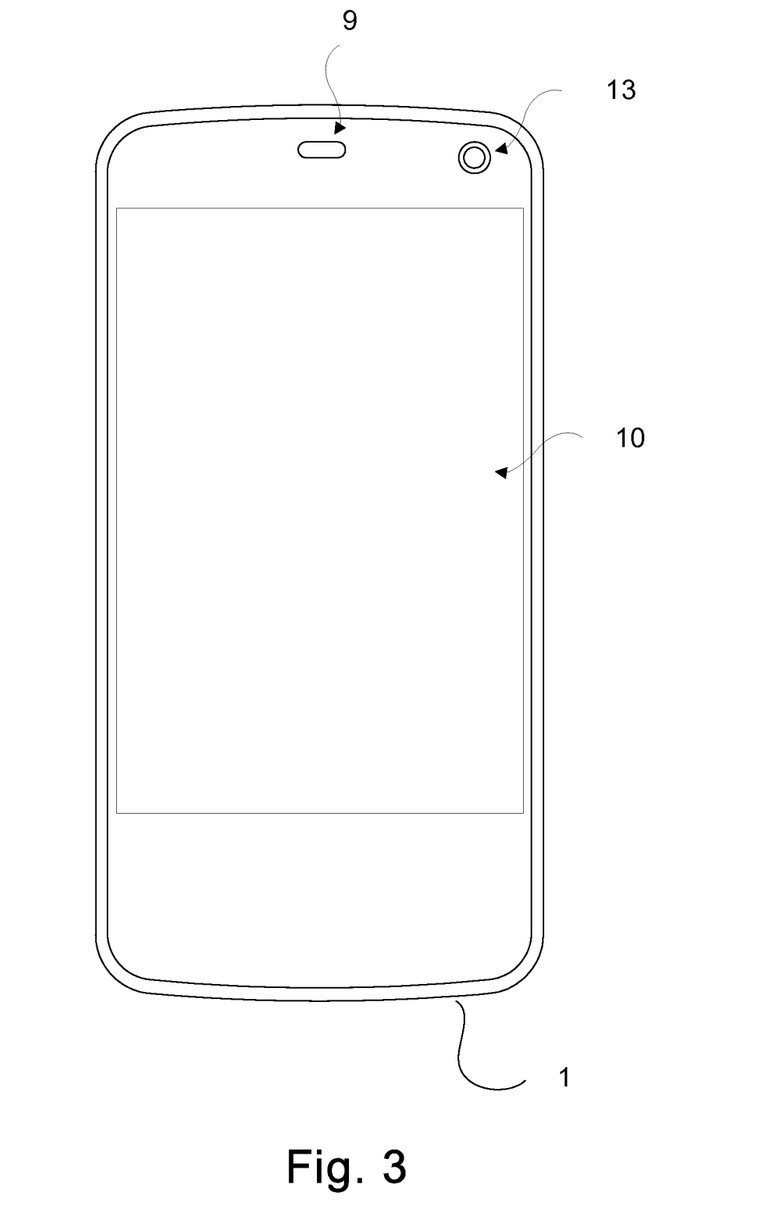
FIG. 3 is an illustration of an electronic user device, which may comprise a route provider and/or a route requester.

The route provider 1 may comprise one or more electronic devices in which the route providing apparatus described above is comprised. For example, the route provider 1 may comprise one or more computer servers which are configured to provide determined routes to user devices over the communication coupling 3. Alternatively, the route provider 1 may comprise an electronic user device. Referring to FIG. 3, an example of such a device is a mobile (e.g. cellular) telephone terminal such as a smartphone. Other examples include tablet computers, laptop computers, personal digital assistants (PDAs), positioning or navigation devices and gaming consoles. Furthermore, although the device shown in FIG. 3 is handheld and portable, the user device may alternatively be a non-portable device such as a desktop computer.

The route requester 2 is configured to generate route requests and to pass the route requests to the route provider 1. The requester 2 may generate and send a route request in response to a user input indicating that the user wishes to be provided with a route between two locations. In addition to specifying the start and finish locations desired for the route, the route request may also include additional information which may be used by the route provider 1 to select the most appropriate route. For example, the route request may contain an indication of whether the route should be easy to follow, the type of terrain which the route should preferably include and the amount of desired climbing and/or descending.

Figure 4:
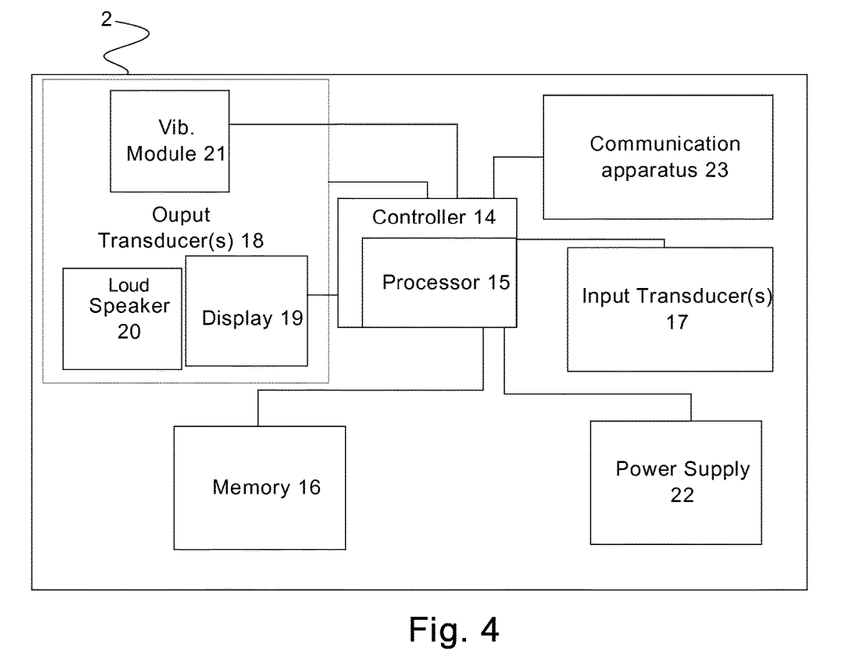
FIG. 4 is a schematic illustration of an electronic apparatus of a route requester.

Referring to FIG. 4, the route requester 2 may comprise one or more controllers 14, each comprising one or more processors 15, which operate under the control of computer readable code to generate route requests and transmit the route requests to the route provider 1. In a similar manner to the route provider code discussed above, the computer code may be stored in a memory 16 of the route requester 2 or in a memory of a separate electronic apparatus with which the route requester 2 is communicatively coupled during operation. The route requester apparatus also comprises input transducers 17 which allow a user to input commands to the route requester 2. Such input commands may initiate creation of a route request, for example by specifying desired start and finish locations for a route. The route requester apparatus may also comprise output transducers 18 which provide a means for the route requester 2 to output information to the user. Such information may comprise one or more routes which have been determined by the route provider 1 in response to the route request and transmitted to the route requester 2, Examples of suitable input and output transducers 17, 18 include touch sensitive transducers overlaid on or integrated into a display panel 19 to form a touch sensitive screen, loudspeakers 20 and vibration modules 21, as discussed above in relation to the route provider 1.

The route requester apparatus may also comprise a power supply 22, the features and function of which may correspond with the power supply 7 discussed above in relation to the route provider 1, and a communication apparatus 23 which facilitates data communication with the route provider 1 over the communication coupling 3. The communication apparatus 23 comprises one or more electronic signal inputs and outputs, transceiver circuitry and a position-locating module which is configured to determine the geographical location of the route requester 2, as discussed previously in relation to the communication apparatus 8 of the route provider 1.

As illustrated in FIG. 1, the route requester 2 may comprise an electronic user device in which the route requester apparatus described above is comprised. The electronic requester device may be separate to the electronic device in which the route provider apparatus is comprised. Examples of suitable user devices are explained above in relation to the discussion of the route provider 1. However, it will be appreciated that the route requester 2 and the route provider 1 may alternatively be comprised in the same electronic device, such as one of the electronic user devices previously discussed, in which case many of the apparatus components of the provider 1 and the requester 2 may be shared in order to avoid unnecessary duplication in the device.

The communication coupling 3 may comprise one or more types of coupling and generally facilitates communication between the route provider 1 and the route requester 2. The communication coupling 3 may also facilitate communication between the provider 1/requester 2 and other electronic devices, such as an external device in which the computer code referred to above is stored or in which route data is stored for use by the route provider 1 in determining routes. The communication coupling 3 may for example comprise an Internet-based communication coupling, one or more telephone networks (e.g. cellular networks) and/or direct device-to-device type communication links such as those which employ Bluetooth or Near Field Communication (NFC) technology. The communication coupling 3 may additionally or alternatively comprise a physical electrical connection between the provider 1 and the requester 2, for example by comprising a communication circuit of which the requester 2 and the provider 1 are both members. Such a physical electrical connection may be used where the route provider 1 and requester 2 are both comprised within the same electronic device.

Overview of Determining a Route

The route provider 1 is configured to determine the route from route data which has been shared, either directly or indirectly, with the route provider 1 by users. This user route data comprises information describing the routes of tracked-journeys which users have made previously and thus are known to be navigable, even if they do not follow mapped roads, paths or trails. The route data may comprise data which was accumulated during the journey.

Use of this shared route data to determine routes allows the route provider 1 to provide routes which can be reliably and safely navigated even in the case where there are no suitable mapped roads or paths available between the desired start and finish locations. A particular example of a set of such route data is a GPS track describing a past journey. However, the route data may alternatively be any type of journey track collected by any suitable position-locating method, such as by triangulation or by using the locations of Wifi hotspots which the sharing user is known to have been within range of during his or her journey. The route data may comprise routes of non-conventional or seasonal paths such as ski-lifts and ski runs. The route data will generally have been tracked from the location of a device which the sharing user was carrying or wearing during the journey.

The route data accurately describes journeys made by users. More specifically, a set of route data may comprise temporal location data tracking a particular past journey. The route data includes geographical location identifiers which give details of where the sharing user was geographically located at regular intervals during the journey, thereby building a track of the journey. The route data may, for example, comprise a series of time-stamped location entries, each of which include the user's XY coordinate location, for example represented by latitude and longitude values, and may also include the user's Z coordinate location, for example represented by an altitude value, at a particular point in time.

Route data for a particular past journey can thus be used to overlay all or part of the route of the past journey on a map, enabling the route to be viewed as a navigation tool on a display panel 10, 19 of the route provider 1 or requester 2, or used in combination with map data to create a series of speakable or displayable navigation instructions which can be output by non-visual output transducers of the route provider 1 or requester 2.

The user route data may be collated in a database of shared journey tracks, which is stored in the memory 6 of the route provider 1 or in one or more external memories which are communicatively coupled to the route provider 1 via the communication coupling 3. The user route data can, for example, be obtained from a location-monitoring service to which users have subscribed and which tracks and records the movements of the users over time.

Each set of route data which describes a particular past user journey may be stored in the shared route database as a separate electronic, indexable document. In addition to the time-stamped location data referred to above, each document may contain other information about the tracked-route such as a route identifier, the length of the route, a distribution of travel durations for the route (for example depending on speed of travel), an elevation profile and the frequency and/or number of times the route is known to have been travelled previously.

As described below, the route provider 1 may be configured to respond to a route request either by determining the route of the most suitable past journey track stored in the shared route database or by determining a new route which comprises connected sections of the routes of one or more past journey tracks stored in the shared route database. The route provider 1 may be configured to identify the most appropriate route data by searching the documented location data referred to above and matching those locations against the start and finish locations defined in the received route request.

Method of Determining a Route

An example of a method by which the route provider 1 may be configured to determine a route in response to a route request using the shared user route data will now be described with respect to FIGS. 5 to 9.

Figure 5:
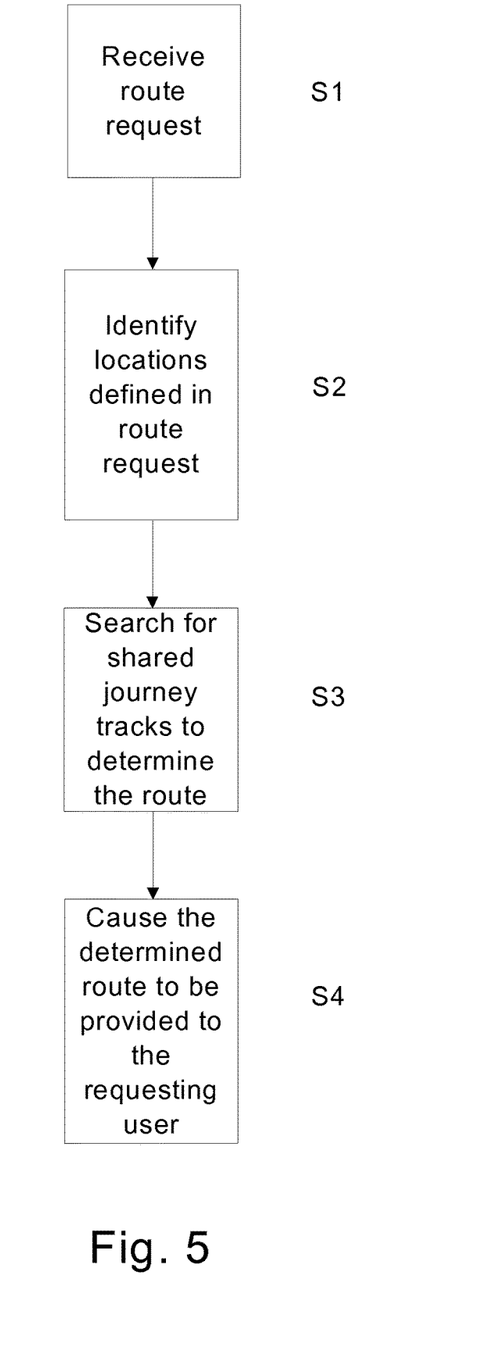
FIG. 5 is a flow diagram of a method of determining and providing a route between two locations using route data describing past journeys of users.

In a first step, S1, the route provider 1 receives a route request from the route requester 2. The route request may be sent to the route provider 1 in response to a user providing an indication to the route requester 2 that he or she wishes to be provided with a route between two particular locations, for example by inputting an instruction through an input transducer 17 of an electronic device. The route request may include indications of route preference, or route constraints, which should be used by the route provider 1 to determine the route. For example, the route request may include an indication that the user wishes to be provided with an 'off-road' route or similar. Other types of indication which may be comprised in the route request include the following: That the user wishes the route to be suitable for navigation by cars or by four-wheel drive vehicles; that the user wishes the route to be suitable for navigation by trucks, such as HGVs; that the user wishes the route to be navigable by pedestrians; that the user wishes the route to be suitable for navigation on skis; and that the user wishes the route to be suitable for navigation by boat.

A second step S2 of the method comprises identifying the locations which are specified in the route request, such as desired start and end points. These locations may also include intermediate points through which the route should preferably pass between the start and end points, for example because the user wishes to travel from location A to location B via location C. The starting location for the route may be determined automatically as the location from which the user's route request is sent. This may be determined as the location of the electronic user device in which the route requester 2 is comprised.

A third step S3 of the method comprises searching for shared user journey tracks, the routes of which could be used as all or part of a route between the locations defined in the route request. To do this, the route provider 1 may be configured to search for shared journey tracks which pass within a predetermined distance of, or area around, locations specified in the route request. For example, referring to FIG. 6, an initial stage S3A of the route searching step S3 may be to search for shared journey tracks which pass through the locations specified in the route request. If one or more shared journey tracks are identified as passing through the locations specified in the route request, then the route provider 1 may cause the route(s) of the journey tracks to be provided to the requesting user in a fourth step S4 of the method. This is explained in more detail below. The provider 1 is configured to provide only the section of the shared journey track which extends between the start and finish locations specified in the route request.

However, before the route of a journey track is determined as being a suitable response to the route request, the route provider 1 may be configured to perform a security check in order to ensure that the route data describing the route of the track is available for sharing and hence to prevent route data from being shared undesirably. For example, referring to FIG. 6, in a second stage S3B of the route searching step S3 the route provider 1 may be configured to determine whether the track which has been identified in the initial stage S3A is available to the requesting user, or whether restrictions placed on the track prevent it from being shared.

Figure 6:
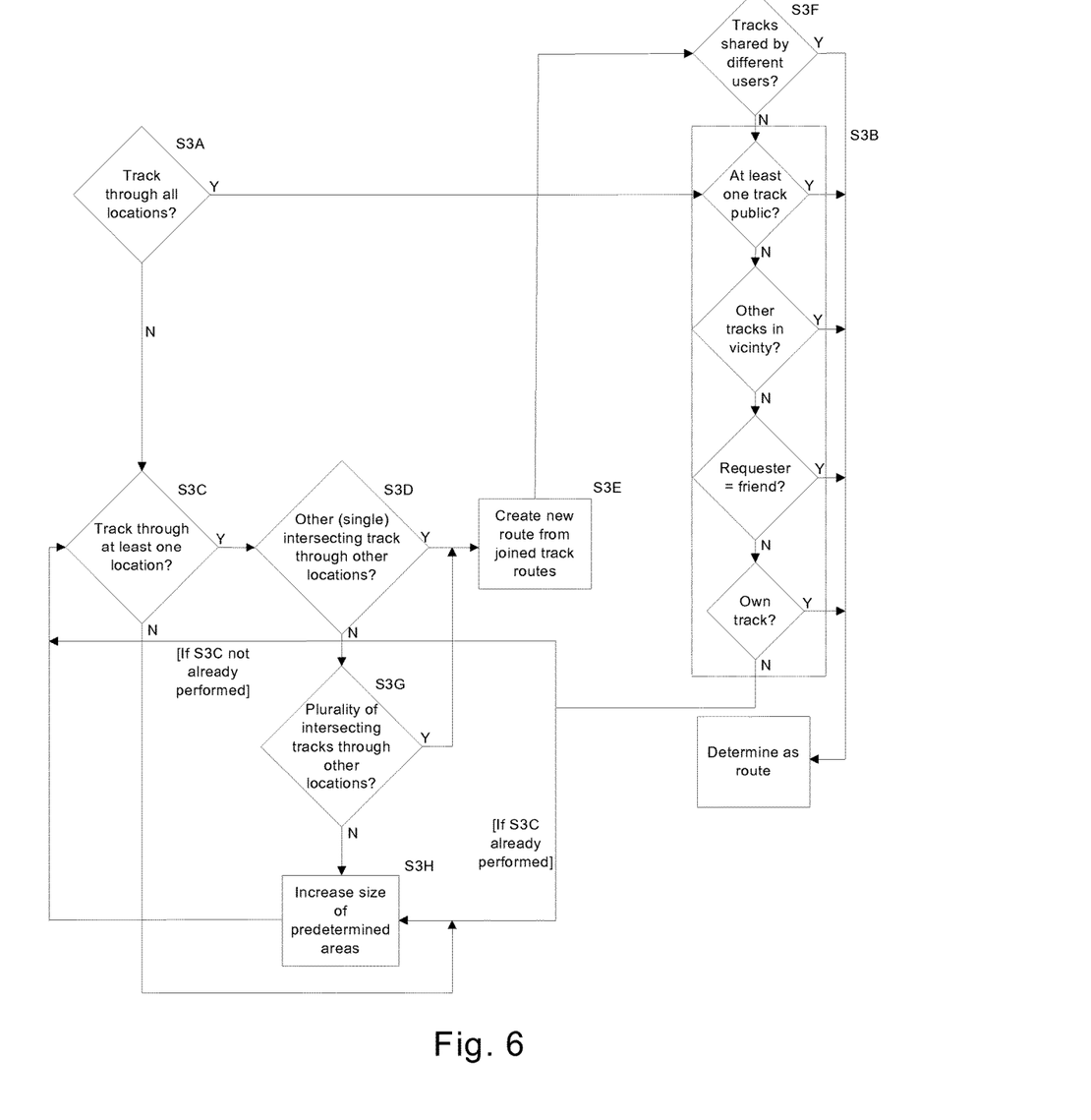
FIG. 6 is a flow diagram of a method of selecting routes of past user journeys to form all or part of a route between locations defined in a route request.

This stage S3B may comprise checking the route data to determine whether the track is marked 'public', or similar, thereby indicating that the sharing user made a positive choice to make the track available to all third parties. Additionally or alternatively the stage S3B may comprise determining whether there is an association between the sharing user and the requesting user, for example by determining whether the users are connected, directly or indirectly, in a social network database. Through this feature, the sharing user may be able to set specific criteria which must be complied with for the route data to be shared. The sharing user is thus able to be selective with regard to which third party users have access to his or her shared tracks.

Additionally or alternatively the second stage S3B may comprise determining whether the track is proximal to other shared tracks in the route database. For example, the route provider 1 may be configured to determine whether there is at least one, or a predetermined plurality, of other shared tracks which pass within a predetermined distance of the section of the track which has been identified in the initial stage S3A.

Additionally or alternatively the second stage S3B may comprise determining whether the identified track was shared by the requesting user, i.e. whether the requesting user and the sharing user are the same person.

A positive answer to any of the example checks described above in relation to the second stage S3B may indicate that the identified track is available to the requesting user. The route provider 1 may require a positive answer to one or a plurality of the checks before causing the identified track to be provided to the requesting user in the fourth step S4 referred to above.

Figure 7:
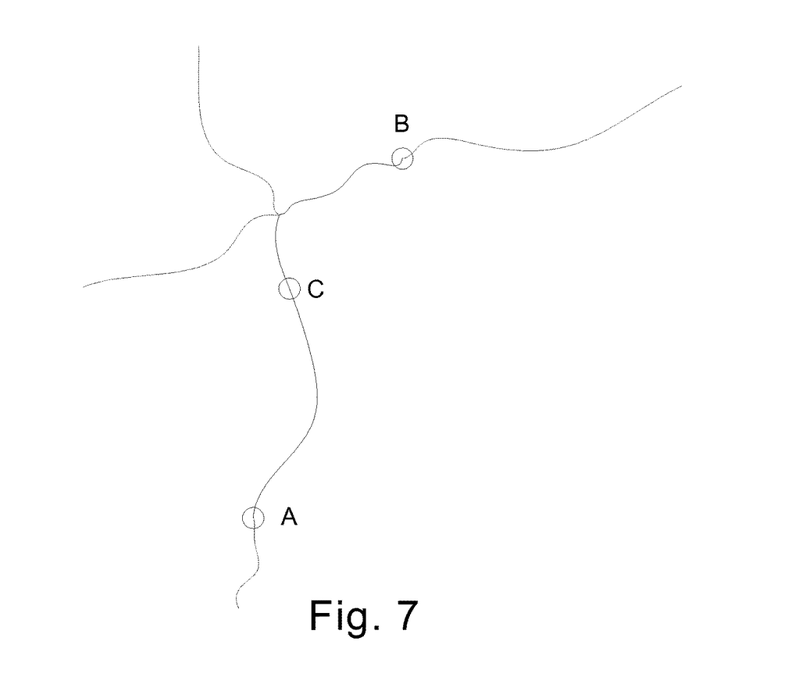
FIG. 7 is an illustration of two intersecting routes of past user journeys which are stitched together to create a route between locations defined in a route request.

If in the initial searching stage S3A the route provider 1 does not identify any tracks which pass through all of the locations defined in the route request, or if the route provider 1 determines that tracks which were identified in the initial searching stage S3A are not available to the requesting user, the route provider 1 is in a third stage S3C configured to search for shared tracks which pass through at least one, but not all, of the locations defined in the route request. If one or more such tracks are identified, the route provider 1 is configured to follow this third stage S3C by searching in a fourth stage S3D for shared tracks which intersect with the tracks identified in the third stage S3C and pass through the remaining location(s) defined in the route request, i.e. those locations through which the track identified in the third stage S3C does not pass. The intersection between tracks preferably takes place in a location which is intermediate the start and end locations defined in the route request. An example is illustrated in FIG. 7, in which it can be seen that a section of a first shared track passes through a start location A and an intermediate location C and a section of a second shared track intersects the section of the first track and passes through the finish location B.

The third and fourth stages S3C, S3D, as well as the first stage S3A, may comprise filtering the shared tracks in order to identify those which comply with the indications of route preference, or constraints, referred to previously. For example, the third and fourth stages S3C and S3D may comprise a filtering process in order to ensure that when intersecting tracks are connected in the fifth stage S3E, the overall route is consistent with the preferences defined in the route request. This prevents the route provider 1 from undesirably creating a route comprising a first track which is a walking trail and a second track which is a motorway, autoroute, fast-highway or similar.

If in the fourth stage S3D the route provider 1 identifies a second shared track which passes through the requested location(s) missing from the first identified track, then the route provider 1 is configured to create a new route comprising the relevant section of the first track and the relevant section of the second track. This comprises the fifth stage S3E of the searching step shown in FIG. 6. The first and second tracks are connected together at their intersection in order to generate the new route. The route provider 1 may then be configured to cause the new route to be provided to the requesting user in the fourth step S4 referred to previously.

In a similar manner to the procedure explained above, before the new route is determined as being a suitable response to the route request, the route provider 1 may be configured to perform one or more security checks in order to ensure that the route data describing the new route is available to the requesting user and to thereby prevent the route data from being shared undesirably. For example, in a sixth stage S3F of the route searching step S3, the route provider 1 may be configured to determine whether at least two of the tracks comprised in the route, such as the first and second tracks identified in the third and fourth stages S3C, S3D, were shared with the route database by different users. If at least two of the tracks are determined to have been shared by different users, this is an indication that the route data is available to the requesting user.

Additionally or alternatively, the route provider 1 may be configured to perform one or more other security checks, for example as discussed above in relation to the second stage S3B, in relation to the connected tracks in order to determine whether the route data is available to the requesting user. For example, the route provider 1 may be configured to determine whether at least one of the shared tracks comprised in the composite route determine in the fifth stage S3E is marked 'public', or similar, thereby indicating that at least one of the sharing users made a positive choice to make the relevant section of the route available to all third parties. Although FIG. 6 illustrates that determination of whether the route comprises at least one public track takes place after the assembly of the route in the fifth stage S3E, determination may alternatively take place immediately after identification of the tracks in the third and fourth stages S3C and S3D.

The other security checks described above in relation to the second stage S3B may be performed in addition or as an alternative to the 'public' check. Each check may be carried out by determining whether at least one of the tracks comprised within the composite route determined in the fifth stage S3E meets the criteria applied by the check. For example, the route provider 1 may be configured to determine whether at least one of the tracks is proximate another shared track, and/or whether at least one of the tracks is associated with the requesting user via a social networking database, and/or whether at least one of the tracks was shared by the requesting user.

A positive answer to any of the checks described in relation to the second and sixth stages S3B, S3F may indicate that the identified route is available to the requesting user. The route provider 1 may require a positive answer to one or a plurality of the checks before causing the identified route to be provided to the requesting user in the fourth step S4 referred to above.

Figure 8:
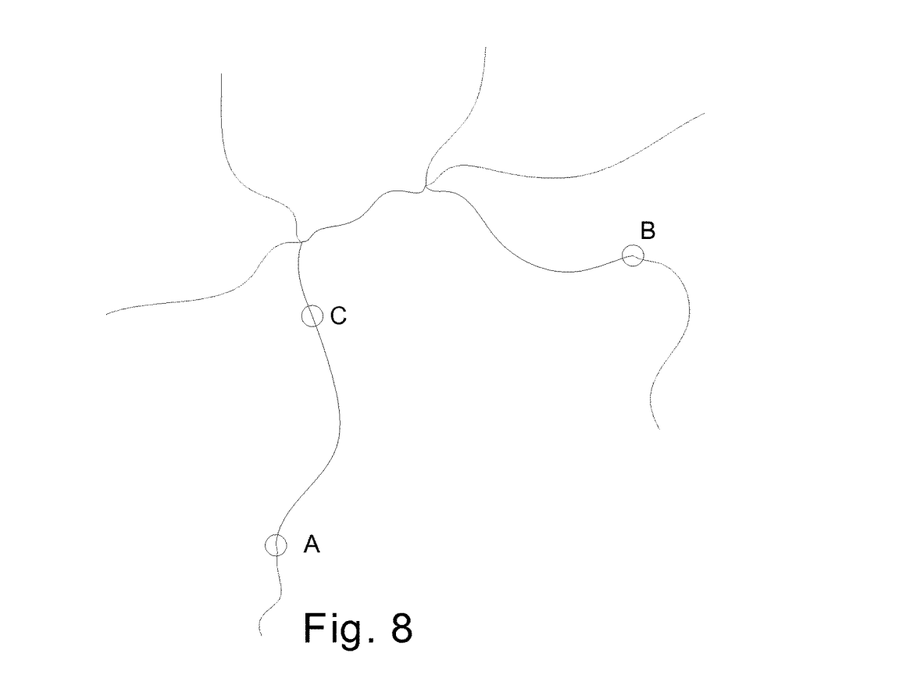
FIG. 8 is an illustration of three intersecting routes of past user journeys which are stitched together to create a route between locations defined in a route request.

If in the fourth stage S3D the route provider 1 determines that the (first) track(s) identified in the third stage S3C do not intersect with another (second) track so as to create a new route which passes through all locations defined in the route request, the route provider 1 is configured to search in a seventh stage S3G for tracks which intersect with the second track and pass through the locations not passed through by the first or second tracks. An example of this is illustrated in FIG. 8, in which it can be seen that a section of a first track passes through a start location A and an intermediate location C, a section of a second track progresses in the approximate direction of the finish location B and a section of a third track intersects the section of the second track and passes through the finish location B.

Upon identifying such a sequence of intersecting shared tracks, the route provider 1 is configured to create a new route comprising the relevant sections of the plurality of tracks joined together at their intersections. This comprises the fifth stage S3E shown in FIG. 6 and discussed previously. The route provider 1 may then be configured to cause the new route to be provided to the requesting user in the fourth step S4 referred to above, subject to the route availability procedure and checks previously discussed.

This stage of the process may be repeated for a maximum preset number of times in order to allow the route provider 1 to build a route comprising a relatively large number of different tracks if required.

If in the initial stage S3A of the searching step the route provider 1 does not identify any shared tracks which pass through at least one location defined in the route request, the route provider 1 is configured in an eighth stage S3H to widen its search criteria by increasing the acceptable distance between the shared tracks and the locations defined in the route request. Put another way, the area around the locations through which the tracks must pass to be considered for the route is increased. For example, whereas in the initial stage S3A the route provider 1 may be configured to search for tracks which pass through or within a relatively small area (e.g. five square meters) around the locations defined in the route request, the route provider 1 may following the eighth stage S3G be configured to search for shared tracks which pass within a relatively larger predetermined distance of the locations defined in the route request. An example of a suitable area around the locations may be ten square meters.

If the route provider 1 identifies such tracks, it then proceeds with the searching stages described above in order to determine suitable routes and cause the routes to be provided to the requesting user.

The route provider 1 may be configured to incrementally increase the acceptable distance between the shared tracks and locations defined in the route request until it identifies a suitable route to be provided to the user or until a maximum distance is reached. For example, the route provider 1 may be configured to incrementally increase the acceptable distance in increments of five meters until it reaches a maximum predetermined distance. If the maximum predetermined distance is reached without the route provider 1 identifying any suitable route, then the searching step S3 may cease and the route provider 1 may cause the requesting user to be provided with a message indicating that no route is available. The maximum predetermined distance may, for example, be set by the requesting user or may be determined automatically by the route provider 1. An example is between 500 and 10,000 meters.

The route provider 1 may be configured to implement the stages of the searching step S3 using a grid-based search. More specifically, the route provider 1 may be configured to overlay a virtual grid onto a map of the geographical area to which the route request relates and to search for shared tracks which pass through grid cells which are the same as or neighbour the grid cells in which the locations defined in the route request are located. If the acceptable distance between the tracks and requested locations is increased, as described above in relation to the eighth stage S3H of the search S3, the route provider 1 is configured to increase the size of the grid cells accordingly to facilitate the wider search.

Figure 9:
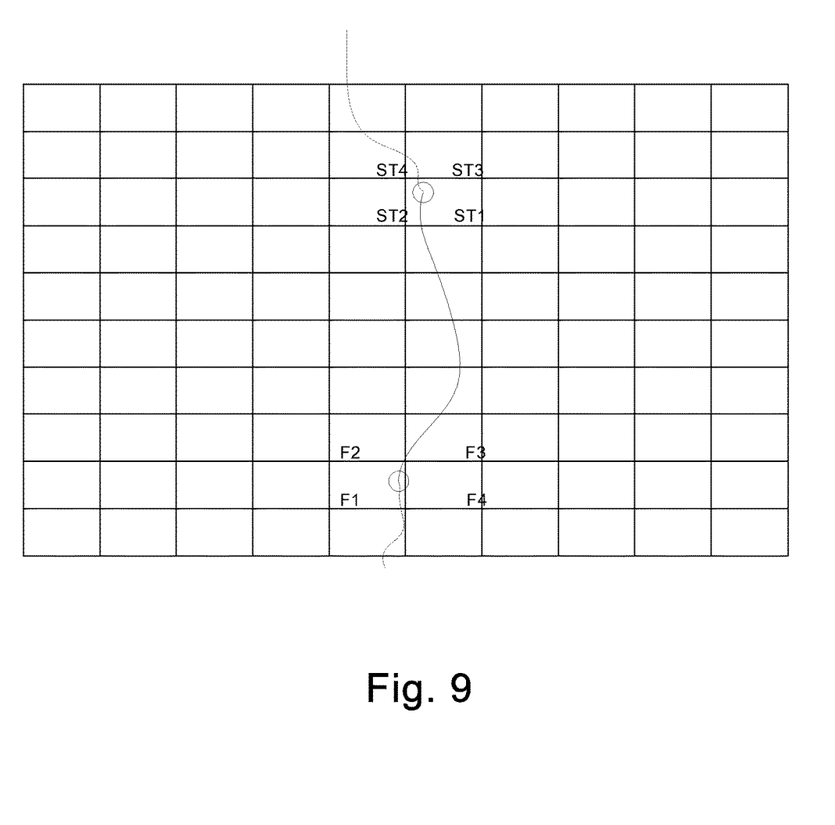
FIG. 9 is an illustration of a grid-based searching step which identifies routes of past user journeys which pass through the vicinity of the locations defined in a route request.

An example of such a grid-based search is illustrated in FIG. 9. In this example, the route provider 1 is configured to identify the four grid cells which are closest to the start and finish locations defined in the route request. The cells are labelled ST1, ST2, ST3, ST4 and F1, F2, F3, F4 accordingly. For each pair of start and finish cells, the route provider 1 is configured to retrieve all of the shared track documents which contain a location identifier in both cells.

As referred to above, in a fourth step S4 of the route providing method the route provider 1 is configured to cause one or more routes to be provided to the requesting user. For example, if a plurality of possible routes are determined in the searching step S3, the route provider 1 may cause a plurality of alternative routes to be provided to the requesting user so that the user may make his or her own selection of which route to follow.

The route provider 1 may cause the route(s) to be provided via a user interface of the route provider 1, the route requester 2 or a separate electronic device which is communicatively coupled to the route provider 1 by the coupling 3 referred to above. For example, the route provider 1 may be configured to cause the route(s) to be displayed on a display 10, 19 of an electronic device in which the route provider 1 or route requester 2 is comprised or output the route(s) using one or more of the other output transducers 11, 12, 18 previously discussed. If a plurality of different alternative routes have been determined, the routes or a subset of the routes may be displayed together on a map in the display 10, 19. There may also be provided a list-type view, which allows the user of the device to cause different ones of the alternative routes to be displayed on the aforementioned map by selecting the routes from the list.

If there are a large number of alternative routes, the route provider 1 may provide only a subset of the routes to the requesting user by selecting the (e.g. five) shortest routes.

It will be appreciated that the steps and operations described above can be performed or caused to be performed entirely by the controller(s) 4 of the route provider 1, using the memory 6, by implementing computer implementable instructions stored in the memory 6. However, it will also be appreciated that one or more of the steps may alternatively be performed at the route requester 2, in particular the provision of the determined routes to the requesting user generation of the memorable route request and the display or other communication of the determined route to a user.

Some portions of the above description present the features of the invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, the reference to these arrangements of operations in terms of modules should not be considered to imply a structural limitation and references to functional names is by way of illustration and does not infer a loss of generality.

Unless specifically stated otherwise as apparent from the description above, it is appreciated that throughout the description, discussions utilising terms such as "processing" or "identifying" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the invention include process steps and instructions described herein in the form of an algorithm. It should be understood that the process steps, instructions, of the invention as described and claimed, are executed by computer hardware operating under program control, and not mental steps performed by a human. Similarly, all of the types of data described and claimed are stored in a computer readable storage medium operated by a computer system, and are not simply disembodied abstract ideas.

The invention also relates to an apparatus for performing the operations herein. This apparatus may be specially constructed for the required purposes, or it may comprise a general-purpose computer selectively activated or reconfigured by a computer program stored on a computer readable medium that can be executed by the computer. Such a computer program is stored in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The controller(s) 4, 14 referred to above may take any suitable form. For instance, the controller(s) 4, 14 may comprise processing circuitry, including the one or more processors 5, 15, and the memory devices 6, 16, comprising a single memory unit or a plurality of memory units. The memory devices 6, 16 may store computer program instructions that, when loaded into processing circuitry, control the operation of the route provider 1 and/or route requester 2. The computer program instructions may provide the logic and routines that enable the apparatus 1, 2 to perform the functionality described above. The computer program instructions may arrive at the apparatus 1, 2 via an electromagnetic carrier signal or be copied from a physical entity such as a computer program product, a non-volatile electronic memory device (e.g. flash memory) or a record medium such as a CD-ROM or DVD. Typically, the processor(s) 5, 15 of the controller(s) 4, 14 are coupled to both volatile memory and non-volatile memory. The computer program is stored in the non-volatile memory and is executed by the processor(s) 5, 15 using the volatile memory for temporary storage of data or data and instructions. Examples of volatile memory include RAM, DRAM, SDRAM etc. Examples of non-volatile memory include ROM, PROM, EEPROM, flash memory, optical storage, magnetic storage, etc. The terms 'memory', 'memory medium' and 'storage medium' when used in this specification are intended to relate primarily to memory comprising both non-volatile memory and volatile memory unless the context implies otherwise, although the terms may also cover one or more volatile memories only, one or more non-volatile memories only, or one or more volatile memories and one or more non-volatile memories.

The algorithms and operations presented herein can be executed by any type or brand of computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the invention is not described with reference to any particular programming language. It is appreciated that a variety of programming languages may be used to implement the teachings of the invention as described herein.

The invention claimed is:

1. A computer implemented method of determining a route, comprising:
    searching, by one or more computing devices, journey tracks shared by users to identify at least one journey track which is located within a predetermined area of a defined route start location, wherein the journey tracks comprise the locations of a mobile user device during a journey made by a user;
    searching, by the one or more computing devices, journey tracks shared by users to identify at least one journey track which is located within a predetermined area of a defined route finish location;
    performing, by the one or more computing devices, a security check associated with the identified journey tracks to determine if the identified journey tracks are available for sharing with a requesting user, wherein performing the security check comprises:
        determining, by the one or more computing devices for each identified journey track, whether at least a predetermined number of other journey tracks shared by users pass within a predetermined distance of at least a portion of such identified journey track; and
        designating as available for sharing, by the one or more computing devices, each identified journey track for which it is determined that at least the predetermined number of other journey tracks shared by users pass within the predetermined distance of at least the portion of such identified journey track; and
    using a plurality of the identified journey tracks to determine, by the one or more computing devices, a route between the defined start and finish locations based at least in pan on the security check, wherein determining the route comprises forming the route from intersecting journey tracks identified from the plurality of journey tracks and available for sharing, wherein the route consists of journey tracks, wherein at least one of the identified journey tracks from the plurality of the identified journey tracks comprises a journey track that does not follow an existing mapped road.

2. The method of claim 1, wherein the journey tracks comprise a series of locations at which the user was located during the journey.

3. The method of claim 2, wherein the series of locations were determined as the journey was made by the user.

4. The method of claim 1, wherein a first of the identified journey tracks is located within the predetermined area of the start location and a second of the identified journey tracks intersects the first identified journey track and is located within the predetermined area of the finish location.

5. The method of claim 1, comprising connecting the plurality of identified journey tracks at intersections between them to create a continuous route and determining the route as the created continuous route.

6. The method of claim 1, wherein searching the shared journey tracks comprises determining a geographical proximity of each shared journey track to the start location and/or finish location in order to identify tracks which pass through the predetermined areas of the start location, finish location, or combinations thereof.

7. The method of claim 6, wherein determining the geographical proximity comprises determining a distance between each shared journey track and the start and/or finish locations.

8. The method of claim 6, wherein determining the geographical proximity of each shared journey track to the start and/or finish locations comprises reading a geographical location identifier associated with each shared journey track and comparing it with a geographical location identifier associated with the start location, finish location, or combinations thereof.

9. The method of claim 8, wherein each geographical location identifier indicates a cell of a cellular grid overlaid on a map.

10. The method of claim 1, wherein one or more of the journey tracks are associated with privacy information which restricts their availability for use in the route determination.

11. The method of claim 1, comprising determining the route in response to receipt of a route request defining the start and finish locations.

12. The method of claim 1, comprising causing the route to be provided to a user.

13. A computer implemented method of determining a route, comprising:
    identifying, by one or more computing devices, at least a first shared GPS track which is available for sharing and which passes through a geographical area specified in a route request, wherein identifying the first shared GPS track comprises:
        searching, by the one or more computing devices, GPS tracks shared by users to identify at least one GPS track which is located within a predetermined area of the geographical area;
        performing, by the one or more computing devices, a security check associated with the identified GPS tracks to determine if the identified GPS tracks are available for sharing with a requesting user, wherein performing the security check comprises:
            determined, by the one or more computing devices for each identified GPS track, whether at least a predetermined number of other GPS tracks shared by users pass within a predetermined distance of at least a portion of such identified GPS track; and designating as available for sharing, by the one or more computing devices, each GPS track for which it is determined that at least the predetermined number of other GPS tracks shared by users pass within the predetermined distance of at least the portion of such identified GPS track; and determining, by the one or more computing devices, a route between two geographical locations which includes at least a part of the first shared GPS track.

14. The method of claim 13, comprising identifying at least two shared GPS tracks which pass through the geographical area and connecting the at least two tracks together to form the route.

15. A route provider apparatus for determining a route, comprising at least one computer processor and at least one computer-readable memory storing instructions which when executed by the at least one processor cause the at least one processor to:

search journey tracks shared by users to identify at least one journey track which is located within a predetermined area of a defined route start location, wherein the journey tracks comprise the locations of a mobile user device during a journey made by a user;

search journey tracks shared by users to identify at least one journey track which is located within a predetermined area of a defined route finish location;

perform a security check associated with the identified journey tracks to determine if the identified journey tracks are available for sharing with a requesting user, wherein the instructions that cause the at least one processor to perform the security check cause the at least one processor to:

determine whether at least a predetermined number of other journey tracks shared by users pass within a predetermined distance of at least a portion of such identified journey track; and designate as available for sharing each identified journey track for which it is determined that at least the predetermined number of other journey tracks shared by users pass within the predetermined distance of at least the portion of such identified journey tracks; and use a plurality of the identified journey tracks to determine a route between the defined start and finish locations based at least in part on the security check, wherein determining the route comprises forming the route from intersecting journey tracks identified from the plurality of journey tracks and available for sharing, wherein the route consists of journey tracks, wherein at least one of the identified journey tracks from the plurality of the identified journey tracks comprises a journey track that does not follow an existing mapped road.

16. A route provider apparatus for determining a route, comprising at least one computer processor and at least one computer-readable memory storing instructions which when executed by the at least one processor cause the at least one processor to:

identify at least a first shared GPS track which is available for sharing and which passes through a geographical area specified in a route request, wherein the instructions that cause the at least one processor to identify at least the first GPS track cause the at least one processor to:

search GPS tracks shared by users to identify at least one GPS track which is located within a predetermined area of the geographical area; and perform a security check associated with the identified GPS tracks to determine if the identified GPS tracks are available for sharing with a requesting user, wherein the instructions that cause the at least one processor to perform the security check cause the at least one processor to:

determine, for each identified GPS track, whether at least a predetermined number of other GPS tracks shared by users pass within a predetermined distance of at least a portion of such identified GPS track; and designate as available for sharing each GPS track for which it is determined that at least the predetermined number of other GPS tracks shared by users pass within the predetermined distance of at least the portion of such identified GPS track; and determine a route between two geographical locations which includes at least a part of the at least one identified GPS track.

17. The apparatus of claim 16, wherein the instructions when executed by the at least one processor cause the at least one processor to identify at least two shared GPS tracks which pass through the geographical area and connect the at least two tracks together to form the route.

18. A system for requesting and determining a route for providing to a user, comprising at least one computer processor and at least one computer-readable memory storing instructions which when executed by the at least one processor cause the at least one processor to:

generate a route request in response to a user input;

respond to the route request by identifying a route start location and a route finish location from the route request;

search journey tracks shared by users to identify tracks which form at least part of a route between the start and finish locations; and perform a security check associated with the identified journey tracks to determine if the identified journey tracks are available for sharing with a requesting user, wherein the instructions that cause the at least one processor to perform the security check cause the at least one processor to:

determine whether at least a predetermined number of other journey tracks shared by users pass within a predetermined distance of at least a portion of such identified journey track; and designate as available for sharing each identified journey track for which it is determined that at least the predetermined number of other journey tracks shared by users pass within the predetermined distance of at least the portion of such identified journey tracks.

19. The computer implemented method of claim 1, wherein searching, by the one or more computing devices, journey tracks shared by users to identify at least one journey track which is located within the predetermined area of the defined route finish location comprises incrementally increasing, by the one or more computing devices, an acceptable distance between the journey tracks and the route finish location until the at least one journey track is identified.

* * * * *